(12) United States Patent
Danguy et al.

(10) Patent No.: US 11,359,545 B2
(45) Date of Patent: Jun. 14, 2022

(54) PYROTECHNIC DEVICE

(71) Applicant: Safran Helicopter Engines, Bordes (FR)

(72) Inventors: François Danguy, Moissy-Cramayel (FR); Laurent Paul Lattanzio Fabbri, Moissy-Cramayel (FR); Romain Maurice Henri Yannick Gauthier, Moissy-Cramayel (FR); Didier Paul Saucereau, Moissy-Cramayel (FR)

(73) Assignee: Safran Helicopter Engines, Bordes (FR)

( * ) Notice: Subject to any disclaimer, the term of this patent is extended or adjusted under 35 U.S.C. 154(b) by 162 days.

(21) Appl. No.: 16/461,944

(22) PCT Filed: Nov. 17, 2017

(86) PCT No.: PCT/FR2017/053156
§ 371 (c)(1),
(2) Date: May 17, 2019

(87) PCT Pub. No.: WO2018/091848
PCT Pub. Date: May 24, 2018

(65) Prior Publication Data
US 2019/0285001 A1    Sep. 19, 2019

(30) Foreign Application Priority Data

Nov. 18, 2016 (FR) ...................................... 1661176

(51) Int. Cl.
*F02C 7/272* (2006.01)
*F02C 7/16* (2006.01)
*F02C 7/264* (2006.01)
*F02C 7/141* (2006.01)
*F02C 7/277* (2006.01)
(Continued)

(52) U.S. Cl.
CPC .............. *F02C 7/272* (2013.01); *F02C 7/141* (2013.01); *F02C 7/16* (2013.01); *F02C 7/264* (2013.01);
(Continued)

(58) Field of Classification Search
CPC .. F02C 7/27; F02C 7/272; F02C 7/277; F02C 7/32; F02K 9/48; F02K 9/56; B60R 21/26
(Continued)

(56) References Cited

U.S. PATENT DOCUMENTS 3,046,741 A * 7/1962 Volk, Jr. .................. F02C 7/272
                                                        60/39.461
3,077,736 A * 2/1963 Feeley, Jr. ............... F02C 7/272
                                                         60/39.47
(Continued)

FOREIGN PATENT DOCUMENTS

CN    102889132 A    1/2013
CN    103388531 A    11/2013
(Continued)

OTHER PUBLICATIONS

International Search Report dated Jan. 2, 2018, in International Application No. PCT/FR2017/053156 (3 pages).
(Continued)

*Primary Examiner* — Todd E Manahan
*Assistant Examiner* — Kyle Robert Thomas
(74) *Attorney, Agent, or Firm* — Bookoff McAndrews, PLLC

(57) ABSTRACT

A pyrotechnic device comprising a main pyrotechnic charge, a firing device for firing the main pyrotechnic charge, a discharge passage for discharging the gas generated by firing the main pyrotechnic charge, and an injector device configured to inject a cooling fluid into said gas discharge passage, so as to deliver gas, specifically for driving turbines, at
(Continued)

temperatures that are relatively low, and a method of cooling gas generated by firing the main pyrotechnic charge by injecting the cooling fluid.

20 Claims, 6 Drawing Sheets

(51) Int. Cl.
  *F02K 9/48* (2006.01)
  *F02K 9/56* (2006.01)
(52) U.S. Cl.
  CPC ............... *F02C 7/277* (2013.01); *F02K 9/48* (2013.01); *F02K 9/56* (2013.01); *F05D 2260/601* (2013.01); *Y02T 50/60* (2013.01)
(58) Field of Classification Search
  USPC ............... 102/530, 531; 280/736, 741, 742
  See application file for complete search history.

(56) References Cited

U.S. PATENT DOCUMENTS

| | | | | |
|---|---|---|---|---|
| 3,117,418 | A * | 1/1964 | McCoy | F02C 7/272 60/789 |
| 3,431,742 | A * | 3/1969 | Green | B64D 25/14 62/48.4 |
| 6,993,915 | B2 * | 2/2006 | Kung | F02C 7/32 60/772 |
| 8,109,533 | B2 * | 2/2012 | Sauer | B60R 21/201 280/736 |
| 2005/0188701 | A1 * | 9/2005 | Kung | F02C 1/00 60/772 |

FOREIGN PATENT DOCUMENTS

| | | |
|---|---|---|
| DE | 19903237 A1 | 8/2000 |
| FR | 3012848 A1 | 5/2015 |
| WO | 0134516 A2 | 5/2001 |
| WO | 2008043946 A2 | 4/2008 |
| WO | 2009113058 A2 | 9/2009 |
| WO | 2014108635 A1 | 7/2014 |
| WO | 2014108649 A1 | 7/2014 |

OTHER PUBLICATIONS

Chinese Office Action in corresponding CN Application No. 201780076279.3, dated Jun. 2, 2021, (13 pages).

* cited by examiner

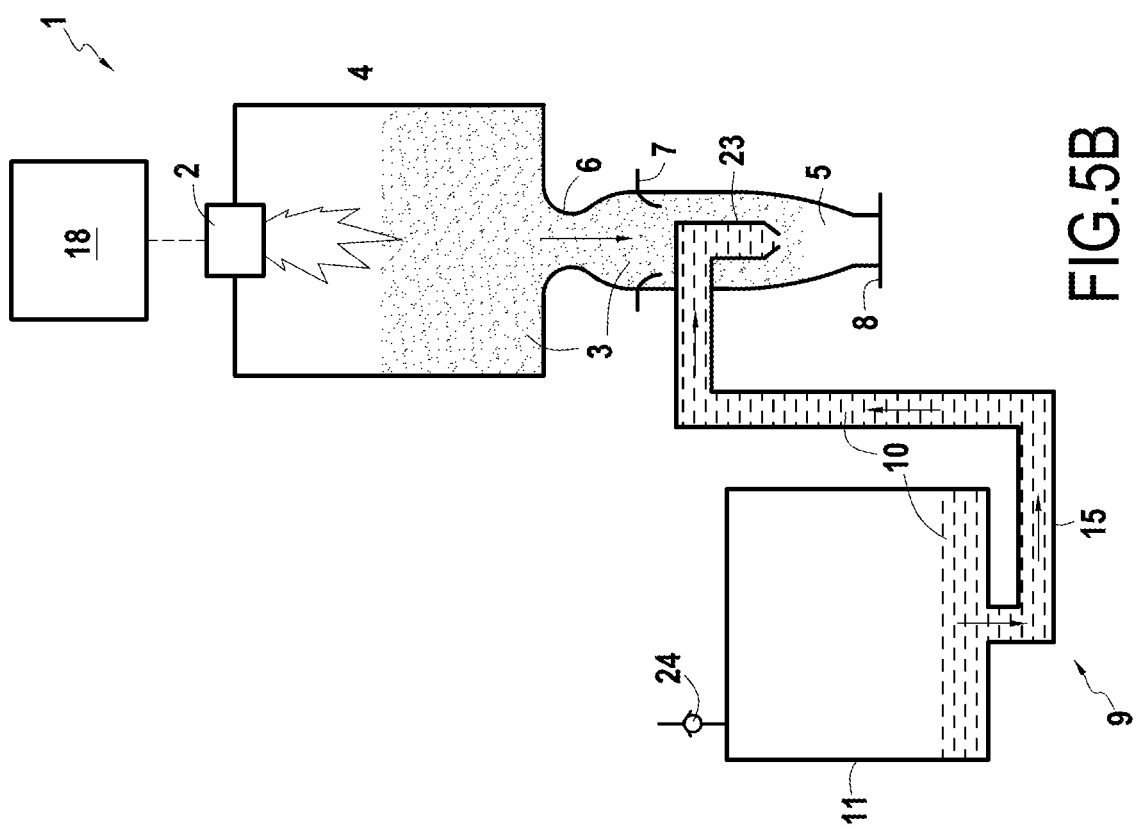
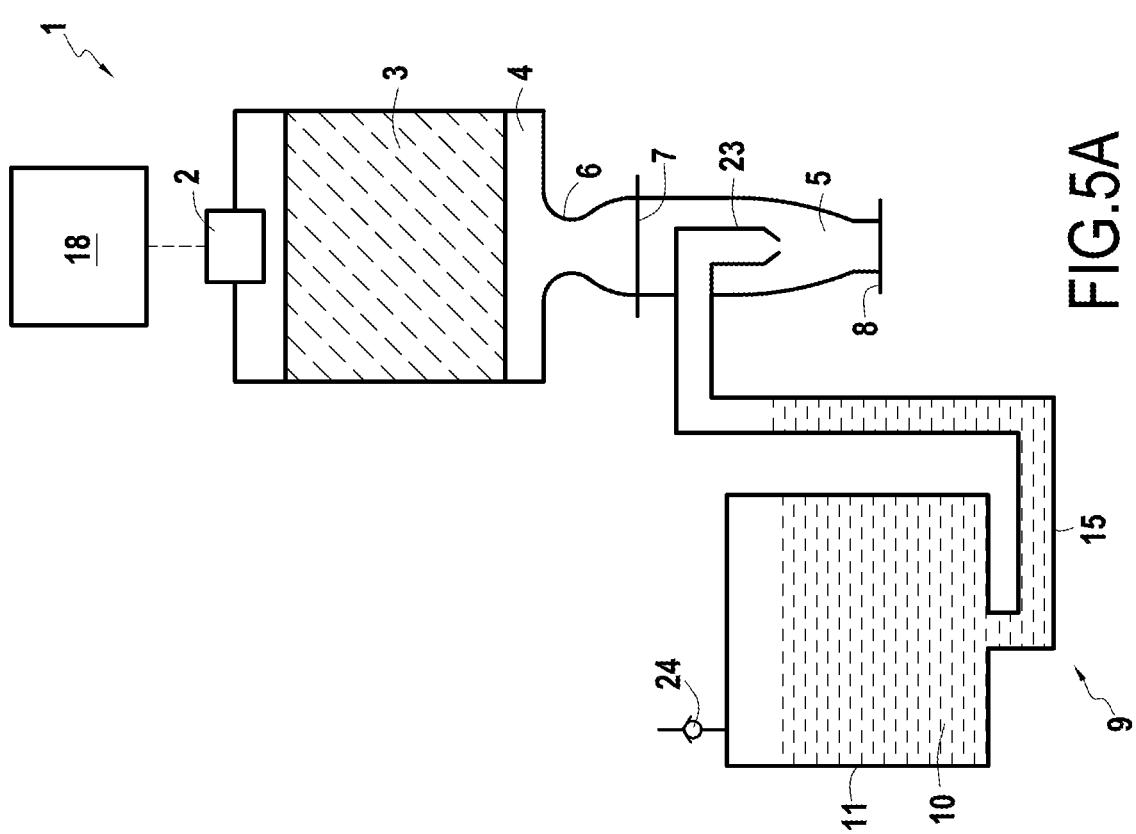

PYROTECHNIC DEVICE

CROSS-REFERENCE TO RELATED APPLICATIONS

This application is the U.S. national phase entry under 35 U.S.C. § 371 of International Application No. PCT/FR2017/053156, filed on Nov. 17, 2017, which claims priority to French Patent Application No. 1661176, filed on Nov. 18, 2016.

BACKGROUND OF THE INVENTION

The present invention relates to the field of pyrotechnic devices.

Pyrotechnic devices comprising a main pyrotechnic charge, a firing device for firing the main pyrotechnic charge, and a discharge passage for discharging the gas generated by firing the main pyrotechnic charge are used in particular for starting turbomachines, such as turbine engines or feed turbopumps for rocket engines. In such applications, the gas generated by firing the main pyrotechnic charge is discharged to an inlet passage of a turbine in order to actuate the turbine so as to start the turbomachine.

Thus, by way of example, in turbine engines such as straight-flow or bypass turbojets, turboprops, or turboshaft engines used in aviation, comprising a compressor, a combustion chamber, and a turbine coupled to the compressor in order to actuate it, such a pyrotechnic device, e.g. connected to a starting turbine, serves to start the turbine and the compressor in order to feed compressed air to the combustion chamber prior to igniting it. In similar manner, in a rocket engine with turbopump feeds, regardless of whether that involves a gas generator cycle, a tap-off cycle, or an expander cycle, such a pyrotechnic device enables the propellant feed turbopump to be started before ignition.

Nevertheless, a drawback with such pyrotechnic devices is that the gas generated by firing the pyrotechnic charge is at very high temperature, thereby requiring the turbines to be designed appropriately and in particular requiring the use of materials capable of withstanding very high temperatures, which is disadvantageous in terms of costs, and also possibly in terms of weight and lifetime.

OBJECT AND SUMMARY OF THE INVENTION

The present disclosure seeks to remedy those drawbacks by providing a pyrotechnic device comprising a main pyrotechnic charge, a firing device for firing the main pyrotechnic charge, and a discharge passage for discharging the gas generated by firing the main pyrotechnic charge, thereby enabling the temperature of said gas to be reduced and thus reducing thermal stresses on materials located downstream.

In at least one embodiment, this object is achieved by the fact that the pyrotechnic device also comprises an injector device configured to inject a cooling fluid into said gas discharge passage.

By means of these provisions, the temperature of the gas can be reduced so as to protect elements located downstream from the gas discharge passage. Furthermore, the expansion of the cooling fluid as a result of absorbing a portion of the heat conveyed by the gas serves to increase significantly the volume flow rate delivered by the pyrotechnic device, and thus increases the amount of work that can be extracted downstream by a turbine.

In order to make it easier to use, said main pyrotechnic charge may in particular be solid. Nevertheless, other pyrotechnic charges (liquid or liquid-solid hybrids) could equally well be envisaged.

The cooling fluid may in particular be aqueous. In this context, the term "aqueous" means a fluid in which the main or even the only component (in terms of weight and/or volume) is water. Water is not only a substance that is easily available, but it also provides high vaporization enthalpy, making it possible to reduce very significantly the temperature of the gas generated by firing the main pyrotechnic charge while using a relatively small quantity of cooling fluid. In addition, its transition to the gaseous state generates a very large amount of additional volume, serving to increase the amount of work that can be extracted downstream by a turbine. Nevertheless, other cooling fluids that are not aqueous could also be envisaged.

In order to enable an aqueous cooling fluid to be used even at low ambient temperatures, the cooling fluid may include an antifreeze, such as, for example: methanol, ethylene glycol, propylene glycol, or glycerol.

In order to inject the cooling fluid into the gas discharge passage, the injector device may in particular comprise a tank for the cooling fluid, the tank being in communication with the discharge passage, and a pressurizing device for pressurizing said tank. Thus, pressurizing the tank by means of the pressurizing device serves to expel the cooling fluid from the tank into the discharge passage, even while gas is being discharged through the discharge passage. Nevertheless, it is also possible to envisage using alternative means, e.g. such as injection pumps.

In order to exert pressure directly on the cooling fluid in the tank, the pressurizing device may in particular comprise a piston in said tank. Nevertheless, alternative means may equally well be used for the same purpose, such as for example a diaphragm.

In order to pressurize the tank of cooling fluid, the pressurizing device comprises an auxiliary pyrotechnic charge in communication with said tank. More particularly, this auxiliary pyrotechnic charge may be installed specifically inside the tank. Control means for firing the main pyrotechnic charge and the auxiliary pyrotechnic charge may be configured in such a manner that the auxiliary pyrotechnic charge is fired before the main pyrotechnic charge, so that the cooling fluid begins to be injected into the discharge passage even before the gas generated by firing the main pyrotechnic charge begins to enter into the discharge passage. Furthermore, the auxiliary pyrotechnic charge may be of dimensions suitable for spreading out the injection of the cooling fluid over a duration that is longer than that for which the gas generated by firing the main pyrotechnic charge is discharged.

As an alternative to an auxiliary pyrotechnic charge, the pressurizing device may alternatively comprise a duct connecting the main pyrotechnic charge to said tank in order to pressurize the tank with the gas generated by firing the main pyrotechnic charge. Thus, the gas generated by firing the main pyrotechnic charge can also serve to pressurize the tank, thereby simplifying the pyrotechnic device.

Nevertheless, the pressurizing device may also be actuated by means that are not pyrotechnic. Thus, when the pressurizing device includes a piston or a diaphragm for exerting pressure directly on the cooling fluid in the tank, the pressurizing device may for example comprise a resilient actuator for acting on the piston or diaphragm after the pressurizing device has been triggered.

In order to retain the cooling fluid prior to injection, the injector device may also include a plug arranged between said tank and the gas discharge passage.

Alternatively, or in addition to the tank pressurizing device, the injector device may include an ejector installed in said discharge passage to inject the cooling fluid into the discharge passage, or at least to assist in injecting it.

In order to protect the main pyrotechnic charge before it is fired, the pyrotechnic device may further comprise a plug installed in said discharge passage.

In particular, said discharge passage may include a coupling for connecting it to a turbine inlet. By way of example, the coupling may be releasable so as to enable the pyrotechnic device to be removed and replaced quickly after it has been used.

The present disclosure also provides a turbomachine including a turbine and the above-mentioned pyrotechnic device, wherein the discharge passage is connected to an inlet passage of the turbine. The gas generated by firing the main pyrotechnic charge can thus serve to actuate the turbine, at least initially.

The turbine may in particular be suitable for coupling to a feed pump of an engine (e.g. a pump for feeding a rocket engine with propellant) in order to drive the feed pump and/or a rotary shaft of an engine (e.g. a shaft connecting a turbine to a compressor in a gas turbine engine) for the purpose of starting the engine.

The present disclosure also provides a method of cooling gas generated by firing a main pyrotechnic charge of a pyrotechnic device, wherein the cooling fluid is injected by an injector device into a discharge passage in which said gas flows.

BRIEF DESCRIPTION OF THE DRAWINGS

The invention can be well understood and its advantages appear better on reading the following detailed description of various embodiments given as non-limiting examples. The description refers to the accompanying drawings, in which:

FIG. 5A is a diagrammatic view of a pyrotechnic device in a fourth embodiment;

FIG. 5B is a diagrammatic view of the FIG. 5A pyrotechnic device after it has been fired;

DETAILED DESCRIPTION OF THE INVENTION

Figure 1A:
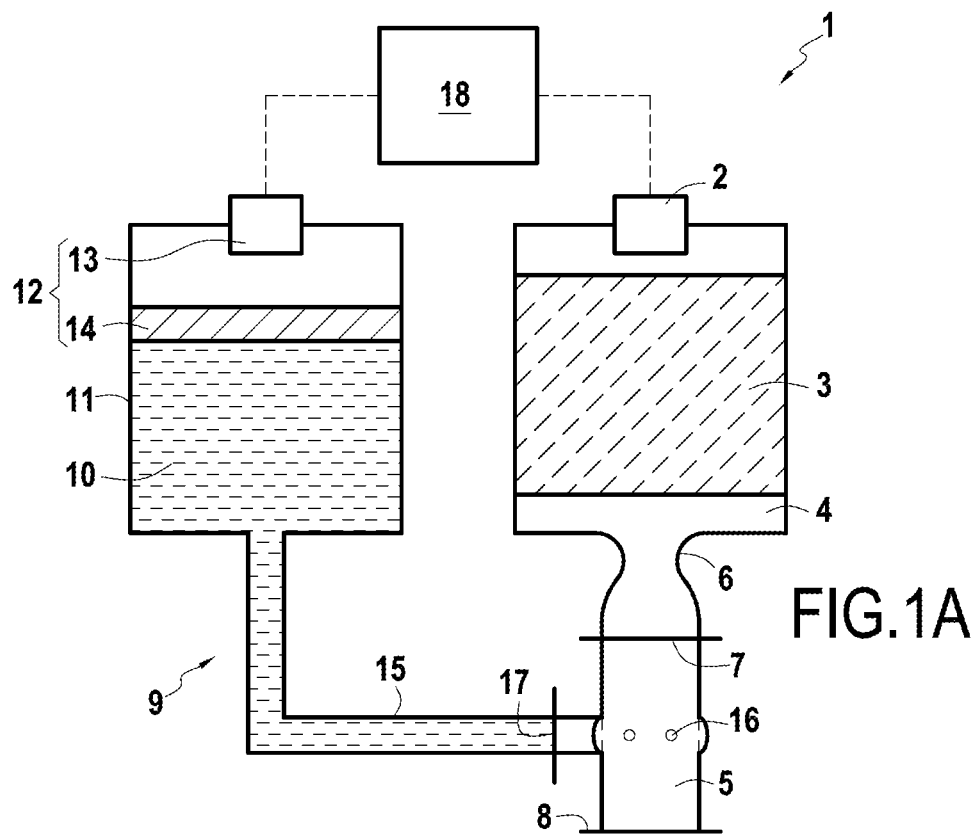
FIG. 1A is a diagrammatic view of a pyrotechnic device in a first embodiment.

A pyrotechnic device 1 in a first embodiment is shown diagrammatically in FIG. 1A. This pyrotechnic device 1 comprises a main pyrotechnic charge 3, with a firing device 2 in a firing chamber 4, and also a discharge passage 5 in communication with the main pyrotechnic charge 3 via a sonic throat 6. A first plug 7 is installed in the discharge passage 5 downstream from the sonic throat 6 and is of dimensions suitable for breaking under the pressure of the gas generated by firing the main pyrotechnic charge 3 so as to allow that gas to be discharged. Nevertheless, as an alternative, a plug that can be opened under control could equally well be envisaged for the same purpose. The discharge passage 5 also has a coupling 8 for connecting the discharge passage 5 to an inlet passage of a turbine. The coupling 8 may in particular be releasable so as to enable the pyrotechnic device 1 to be removed and replaced quickly after it has been used.

Figure 2:
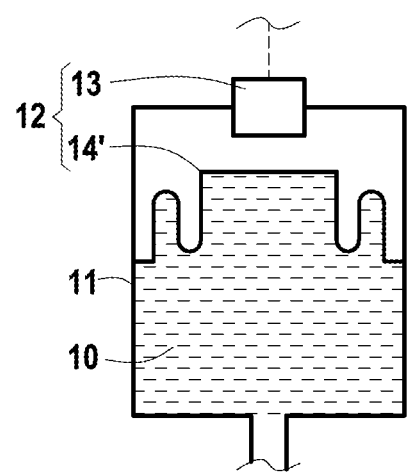
FIG. 2 is a view showing a detail of a variant of the pyrotechnic device of FIGS. 1A and 1B.

The pyrotechnic device 1 also has an injector device 9 for injecting a cooling fluid 10 into the discharge passage 5. For this purpose, in this first embodiment, the injector device 9 comprises a tank 11 containing the cooling fluid 10 and a pressurizing device 12, which is constituted in this embodiment by an auxiliary pyrotechnic charge 13 and by a piston 14 interposed between the auxiliary pyrotechnic charge 13 and the cooling fluid 10. Nevertheless, in a variant as shown in FIG. 2, a diaphragm 14' could replace the piston 14.

The tank 11 is connected via a first duct 15 to orifices 16 for injecting the cooling fluid 10 into the gas discharge passage. A second plug 17 installed in the first duct 15 keeps the cooling fluid 10 apart from the orifices 16. In analogous manner with the first plug 7, the second plug 17 is of dimensions suitable for breaking under the pressure of the cooling fluid 10 when the pressurizing device 12 is activated. Nevertheless, as with the first plug 7, it is also possible as an alternative to envisage using a plug that can be opened under control.

The cooling fluid 10 may in particular be an aqueous liquid optionally incorporating an antifreeze, e.g. such as: methanol, ethylene glycol, propylene glycol, or glycerol, for the purpose of avoiding freezing of the cooling fluid 10 in the tank 11 at low temperatures.

In the embodiment shown, the firing device 2 and the auxiliary pyrotechnic charge 13 are both connected, e.g. electrically, to a control unit 18 that is configured to trigger firing of the auxiliary pyrotechnic charge 13 and, via the firing device 2, also to trigger firing of the main pyrotechnic charge 3. The control unit 18 may be configured to trigger firing of the auxiliary pyrotechnic charge 13 before firing of the main pyrotechnic charge 3 so that the cooling fluid 10 begins to be injected into the discharge passage 5 before the arrival in the discharge passage 5 of the gas generated by firing the main pyrotechnic charge 3. In addition, the auxiliary pyrotechnic charge 13 may be configured so that its deflagration continues for longer than the deflagration of the main pyrotechnic charge 3.

In the embodiment shown, the main pyrotechnic charge 3 and the auxiliary pyrotechnic charge 13 are both solid pyrotechnic charges, in order to make them easier to handle.

Figure 1B:
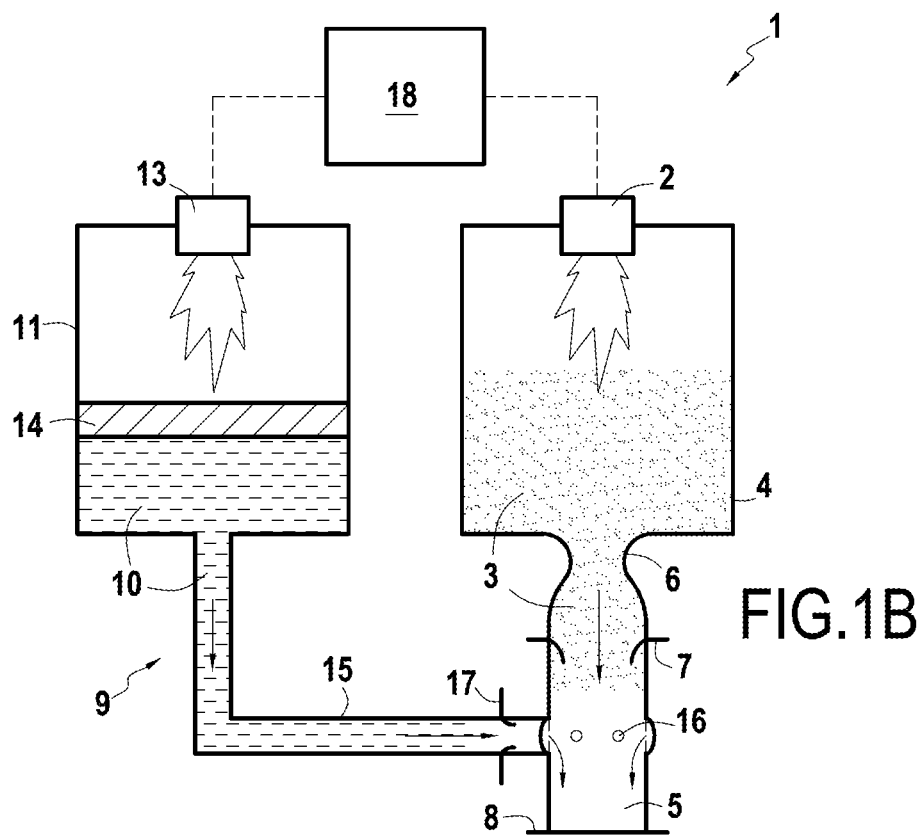
FIG. 1B is a diagrammatic view of the FIG. 1A pyrotechnic device after it has been fired.

In operation, the control unit 18 thus triggers firing of the main pyrotechnic charge 3 so as to generate hot gas at a pressure that breaks the first plug 7 in order to penetrate at high speed into the discharge passage 5 after passing through the sonic throat 6. Furthermore, the control unit 18, by triggering firing of the auxiliary pyrotechnic charge 13, causes the tank 11 to be pressurized by the pressurizing device 12 so that its piston 14, which is driven by the gas generated by firing the auxiliary pyrotechnic charge 13, exerts pressure directly on the cooling fluid 10 in order to expel it from the tank 11 through the first duct 15 where it breaks the second plug 17 and becomes injected through the orifices 16 into the discharge passage 5, where the cooling fluid 10 mixes with the hot gas generated by firing the main pyrotechnic charge 3 flowing through this discharge passage 5, thereby cooling the hot gas, as shown in FIG. 1B.

Figure 3A:
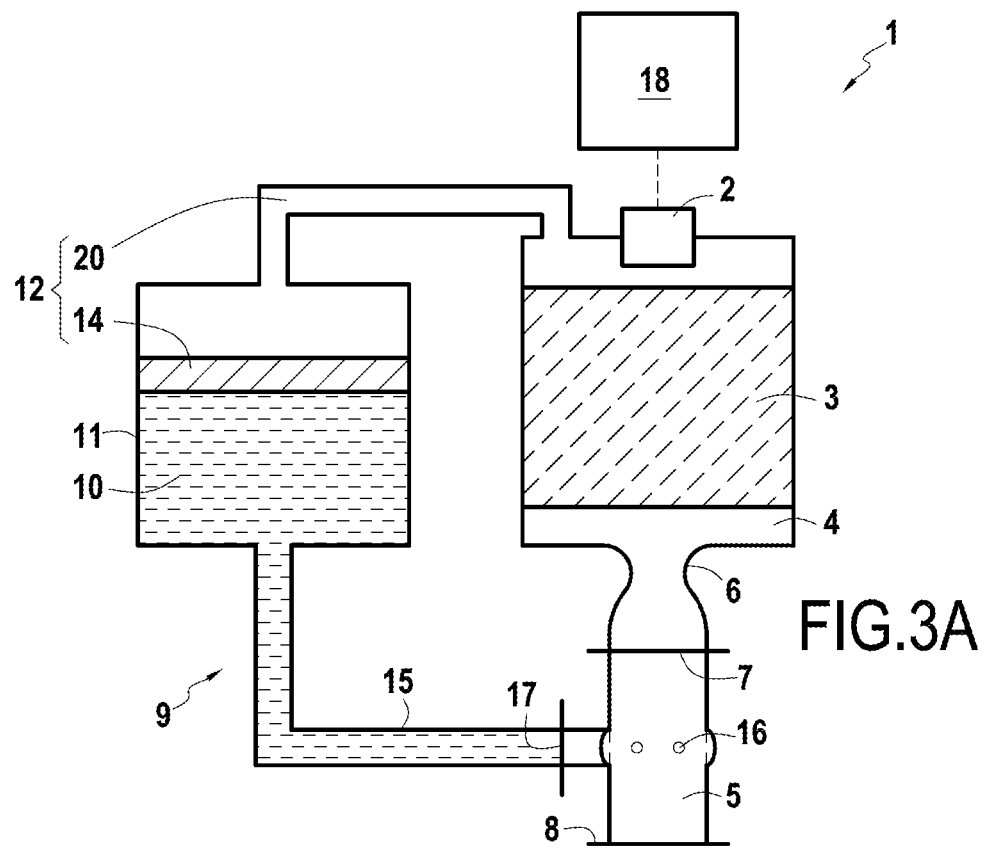
FIG. 3A is a diagrammatic view of a pyrotechnic device in a second embodiment.
Figure 3B:
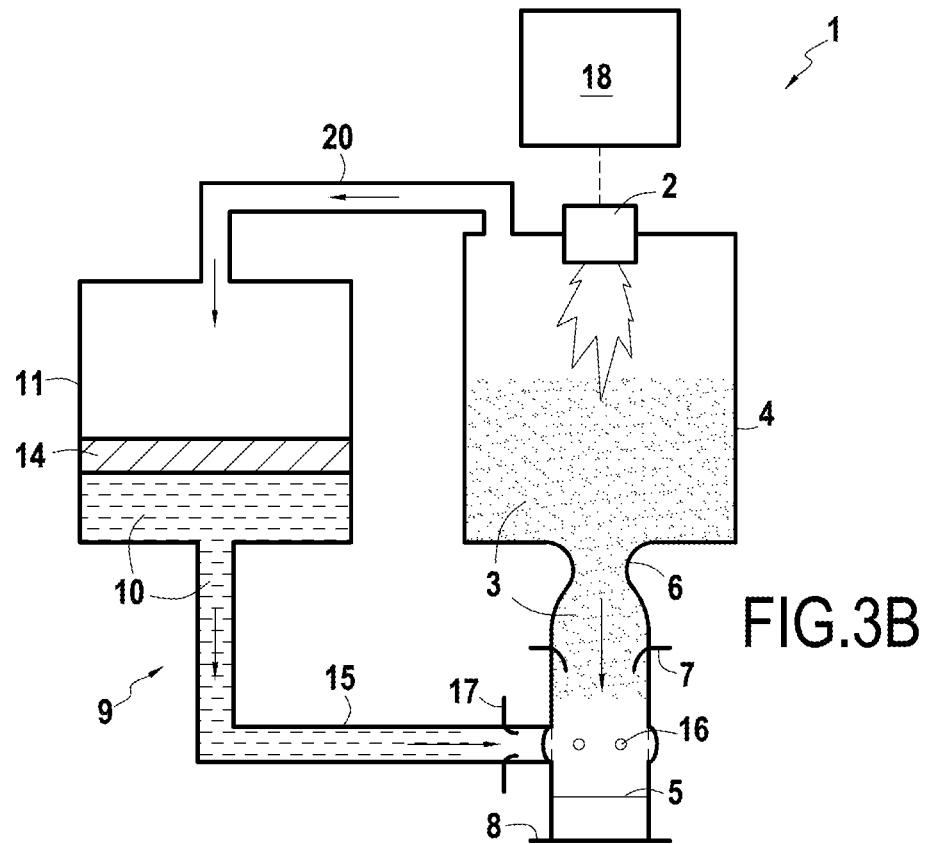
FIG. 3B is a diagrammatic view of the FIG. 3A pyrotechnic device after it has been fired.

As in the first embodiment, in operation, the control unit 18 triggers firing of the main pyrotechnic charge 3 so as to generate hot gas at a pressure that breaks the first plug 7 so as to penetrate at high speed into the discharge passage 5 after passing through the sonic throat 6. Nevertheless, at the same time, another portion of the hot gas generated by firing the main pyrotechnic charge 3 flows via the second duct 20 into the tank 11 where it actuates the piston 14, thereby exerting pressure directly on the cooling fluid 10 in order to expel it from the tank 11 through the first duct 15, where it breaks the second plug 17 and is injected through the orifices 16 into the discharge passage 5, where the cooling fluid 10 mixes with the hot gas generated by firing the main pyrotechnic charge 3 and flowing along the discharge passage 5, thereby cooling the hot gas, as shown in FIG. 3B. As a result of the partial expansion in the sonic throat 6 of the gas generated by firing the main pyrotechnic charge 3, the pressure in the discharge passage 5 is lower than the pressure that exists in the firing chamber 4 and that is transmitted to the tank via the second duct 20.

In particular, when the temperature of the hot gas is substantially higher than the evaporation temperature of the cooling fluid 10, changing the phase of the cooling fluid contributes effectively to cooling the hot gas. In addition, this change of phase serves to increase very significantly the volume flow rate of gas leaving the discharge passage 5 through the coupling, thereby contributing to increasing the mechanical work that can be extracted therefrom by a turbine located downstream.

Although in this first embodiment an auxiliary pyrotechnic charge 13 is used for pressurizing the tank 11, it is possible as an alternative to make use instead of the hot gas generated by firing the main pyrotechnic charge. Thus, in a second embodiment, as shown in FIG. 3A, the auxiliary pyrotechnic charge is replaced in the pressurizing device 12 by a second duct 20 putting the main pyrotechnic charge 3 in the firing chamber 4 into communication with the tank 11. The pyrotechnic device in this second embodiment is analogous to the device of the first embodiment in all of its other aspects, so the same reference numerals as in FIG. 1A are also used in FIG. 3A for all of the elements that are equivalent. Furthermore, as in the variant shown in FIG. 2, a diaphragm 14' could likewise replace the piston 14 in this second embodiment.

Figure 4A:
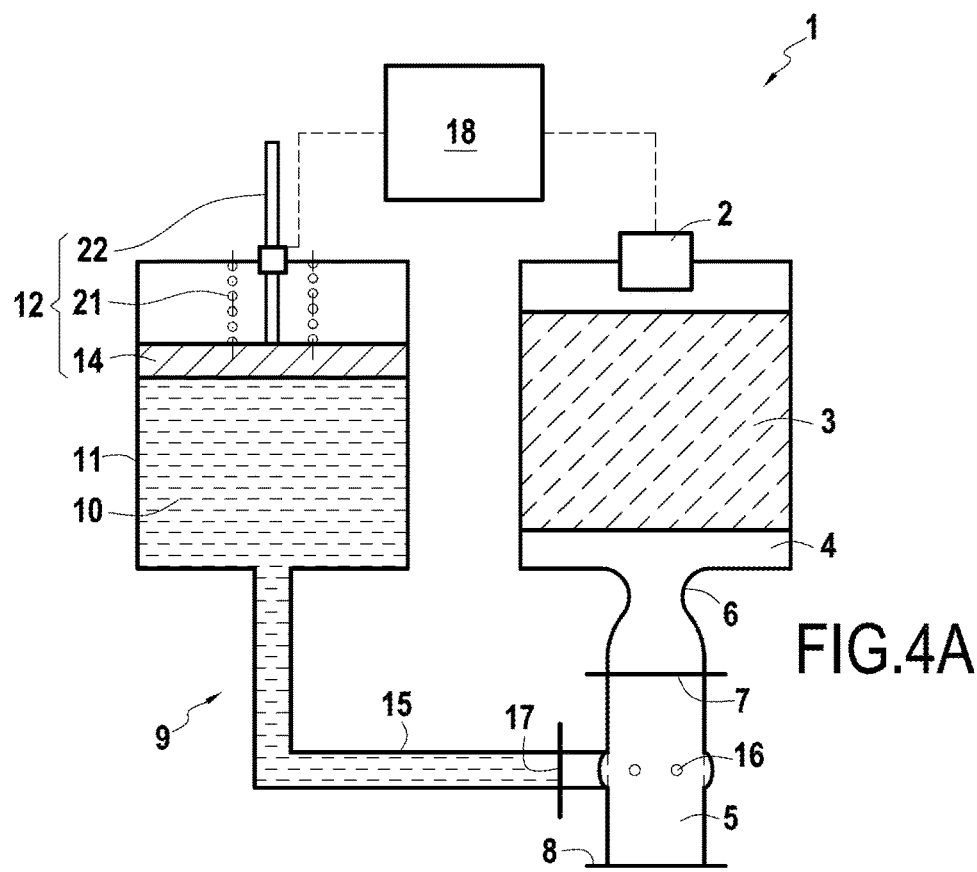
FIG. 4A is a diagrammatic view of a pyrotechnic device in a third embodiment.

Although in both of these first two embodiments, pressurizing is obtained by gas generated by firing a pyrotechnic charge, it is also possible to envisage using non-pyrotechnic means in the pressurizing device. Thus, in a third embodiment, as shown in FIG. 4A, the auxiliary pyrotechnic charge of the first embodiment is replaced in the pressurizing device 12 by a resilient actuator 21, essentially a prestress spring, together with a mechanism 22 for retaining the piston 14, which mechanism is connected to the control unit 18 and is configured to release the piston 14 on receiving a pressurizing trigger signal issued by the control unit 18. Since the pyrotechnic device in this third embodiment is analogous to that of the first embodiment in all of its other aspects, the same reference numerals as in FIG. 1A are used in FIG. 4A for all elements that are equivalent. Furthermore, as in the variant shown in FIG. 2, a diaphragm 14' could likewise replace the piston 14 in this third embodiment. Under such circumstances, it would even be possible to envisage the diaphragm 14' being of resilient configuration and being prestressed so as also to perform the resilient actuation function.

Figure 4B:
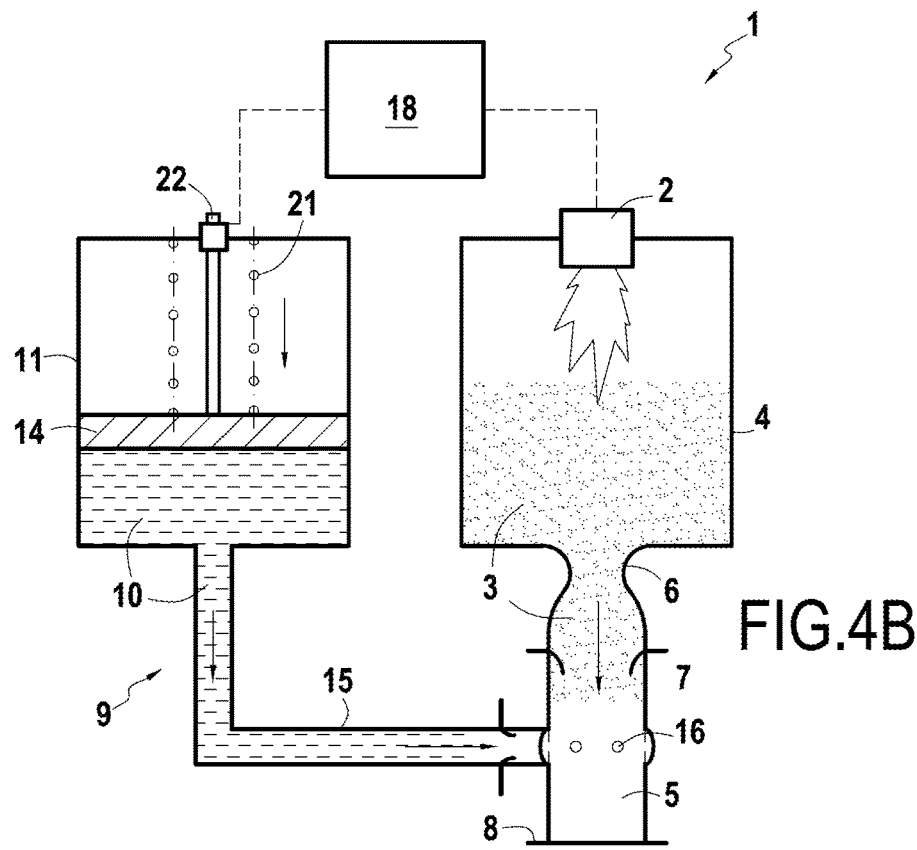
FIG. 4B is a diagrammatic view of the FIG. 4A pyrotechnic device after it has been fired.

In operation, as in the first embodiment, the control unit 18 triggers firing of the main pyrotechnic charge 3 so as to generate hot gas at a pressure that breaks the first plug 7 so as to penetrate at high speed into the discharge passage 5 after passing through the sonic throat 6. Nevertheless, the control unit 18 also triggers release of the piston 14 by means of the retention mechanism 22, thereby causing the tank 11 to be pressurized by the pressurizing device 12 in which the piston 14 driven by the resilient actuator 21 exerts pressure directly on the cooling fluid 10 in order to expel it from the tank 11 through the first duct 15 where it breaks the second plug 17, and injects it through the orifices 16 into the discharge passage 5, where the cooling fluid 10 mixes with the hot gas generated by firing the main pyrotechnic charge 3 that is flowing through the discharge passage 5, in such a manner as to cool the hot gas, as shown in FIG. 4B.

Although in these first three embodiments, the injection of the cooling fluid is obtained by pressurizing the cooling fluid tank, it is also possible to envisage obtaining this injection without having recourse to pressurizing means. Thus, by way of example, an ejector uses the suction that is generated by a first fluid flowing in a passage that is suitably shaped to suck a second fluid into the stream of the first fluid. Thus, in a fourth embodiment, as shown in FIG. 5A, the injector device 9 incorporates an ejector 23 in the discharge passage 5, this ejector being connected to the tank 11 via the first duct 15, thereby replacing the pressurizing device 12 and the orifices 16. Furthermore, in the embodiment shown, no plug is installed in the first duct 15 or in the ejector 23, since they are configured in such a manner as to prevent the cooling fluid 10 from flowing except under the action of the suction generated around the ejector 23 by the flow of gas generated by firing the main pyrotechnic charge 3. In addition, in order to maintain pressure inside the tank 11 while the cooling fluid 10 is being sucked through the duct 15 and the ejector 23, the tank 11 may include a check valve 24 that enables air to enter in order to replace the volume of cooling fluid that has been extracted from the tank 11. Alternatively, the tank 11 could be a flexible tank. Since the pyrotechnic device in this fourth embodiment is analogous to the device of the first embodiment in all of its other aspects, the same reference numerals as in FIG. 1A are used in FIG. 5A for all elements that are equivalent.

In operation, as in all of the above-described embodiments, the control unit 18 triggers firing of the main pyrotechnic charge 3 so as to generate hot gas at a pressure that breaks the first plug 7 so as to penetrate at high speed into the discharge passage 5 after passing through the sonic throat 6. The high speed flow of this hot gas through the discharge passage 5 generates suction around the ejector 23, thereby sucking the cooling fluid 10 from the tank 11 into the discharge passage 5 via the first duct 15 and the ejector 23, thus injecting this cooling fluid 10 into the discharge passage 5, where the cooling fluid 10 mixes with the hot gas generated by firing the main pyrotechnic charge 3 and flowing through the discharge passage 5, so as to cool the hot gas, as shown in FIG. 5B.

In each of these situations, the gas generated by firing the main pyrotechnic charge 3 and cooled by injecting the cooling fluid can be used for generating mechanical work at high pressure for a short period of time. This mechanical work can be extracted from this gas in particular by means of a turbine, and it can serve specifically for starting an engine.

Figure 6:
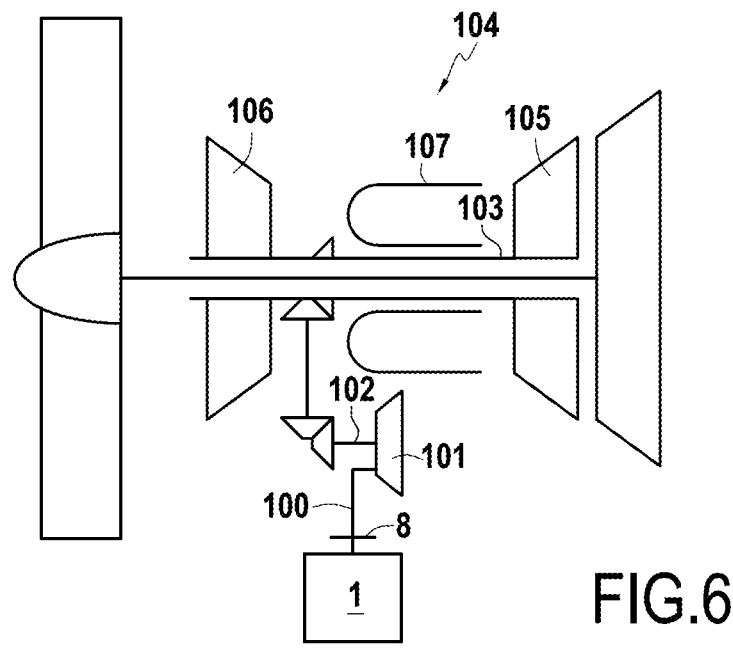
FIG. 6 is a diagram showing a gas turbine engine fitted with a pyrotechnic device in accordance with any of the first and fourth embodiments.

Thus, in an example shown in FIG. 6, the pyrotechnic device 1, which may be a pyrotechnic device in accordance with any of the above-described embodiments, is connected via the coupling 8 to the inlet passage 100 of a first turbine 101, more specifically a supersonic turbine, having its outlet shaft 102 rotatably coupled to a rotary shaft 103 of an engine 104, and more particularly of a bypass turbojet as used for propulsion in aviation, having a compressor 106, a combustion chamber 107, and a second turbine 105 connected to the compressor 106 by the rotary shaft 103 in order to drive it.

In operation, the gas generated by firing the main pyrotechnic charge 3 of the pyrotechnic device 1 and cooled by injecting the cooling fluid 10 passes via the coupling 8 and the inlet passage 100 to reach the first turbine 101 where expansion of the gas generates mechanical work, which is transmitted to the rotary shaft 103 via the outlet shaft 102 so as to drive the compressor 106 in order to supply air under pressure to the combustion chamber 107 so as to enable it to be ignited. The pyrotechnic device 1 and the first turbine 101 together form a starter enabling the engine 104 to be put into operation quickly. It should be observed that although in this example this application is used specifically with a bypass turbojet, it is equally well adapted to other types of gas turbine engine, and even to other types of fuel-burning engine, in particular piston engines.

Figure 7:
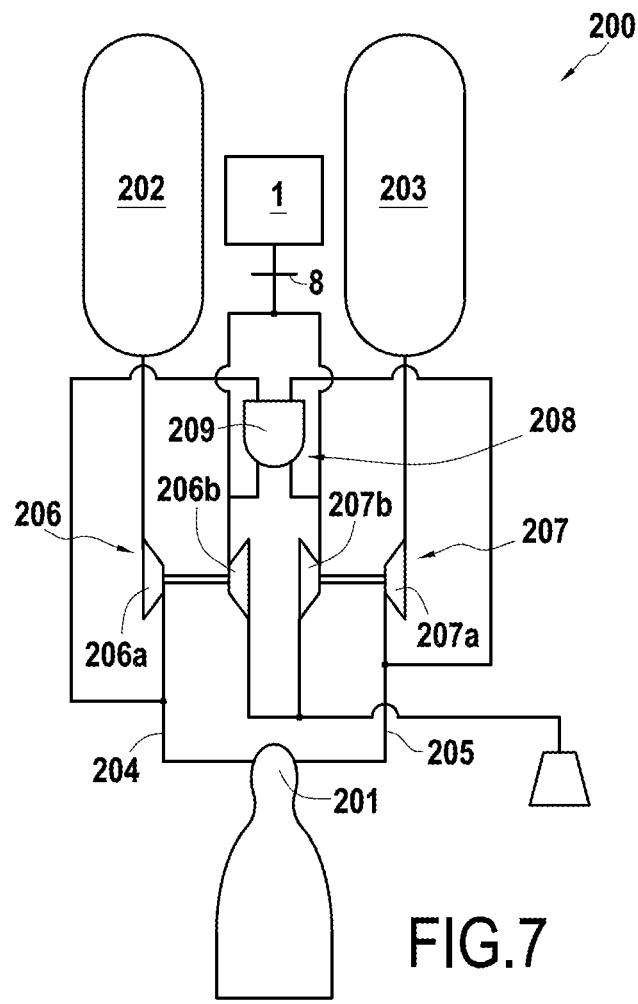
FIG. 7 is a diagram showing a rocket engine fitted with a pyrotechnic device in accordance with any of the first and fourth embodiments.

Furthermore, a pyrotechnic device 1 in accordance with any of the above-described embodiments can also have other applications, and in particular the application of starting a propellant feed turbopump. Thus, in an example shown in FIG. 7, a rocket engine 200 has a propulsion chamber 201, two propellant tanks 202 and 203, and two feed circuits 204 and 205, each connecting a respective one of the propellant tanks 202 and 203 to the propulsion chamber 201 in order to feed it with propellants. Each feed circuit 204, 205 includes a respective turbopump 206, 207, and each turbopump 206, 207 comprises a pump 206a, 207a and a turbine 206b, 207b for driving the corresponding pumps 206a, 207a. The rocket engine 200 also has a gas generator 208 with a combustion chamber 209 connected to branch connections from the two feed circuits in order to feed it with propellants, and two outlet ducts 210 and 211, each connected to the inlet of a respective one of the turbines 206b and 207b so that the gas obtained by combustion of the propellants in the combustion chamber 209 of the gas generator 208 drives the turbines 206b and 207b.

Nevertheless, in order to enable the turbopumps 206 and 207 to start before propellants reach the combustion chamber 209 of the gas generator 208, the rocket engine 200 also has a pyrotechnic device 1 in accordance with any of the above-described embodiments, which device is connected to the inlets of both turbines 206b and 207b via the coupling 8.

Thus, in operation, the gas generated by firing the main pyrotechnic charge 3 of the pyrotechnic device 1 and cooled by injecting the cooling fluid 10 passes through the coupling 8 and reaches the inlets of the turbines 206b and 207b, where expansion of the gas begins to drive the turbopumps 206 and 207 in order to deliver the propellants to the combustion chamber 209 of the gas generator 208. After this combustion chamber 209 has ignited, the gas generated by combustion of the propellants in the combustion chamber 209 can take over from the gas coming from the pyrotechnic device 1 in order to continue driving the turbines 206b and 207b, thereby maintaining the flow of propellants and the operation of the rocket engine 200. It should be observed that although in this example this application is illustrated specifically with a gas generator rocket engine, it is equally possible to envisage using it with other types of rocket engines having turbopump feed, such as for example combustion tap-off rocket engines, expander rocket engines, or staged-combustion rocket engines.

Furthermore, although the present invention is described with reference to specific embodiments, it is clear that various modifications and changes may be undertaken on those embodiments without going beyond the general ambit of the invention as defined by the claims. In particular, individual characteristics of the various embodiments mentioned may be combined in additional embodiments. In particular, the ejector of the fourth embodiment could also be combined with any one of the pressurizer devices of the first three embodiments, in order to combine their advantages. Consequently, the description and the drawings should be considered in a sense that is illustrative rather than restrictive.

The invention claimed is:

1. A pyrotechnic device comprising a main pyrotechnic charge, a firing device for firing the main pyrotechnic charge, a discharge passage for discharging the gas generated by firing the main pyrotechnic charge, wherein the gas is discharged from the discharge passage to a turbine of a turbomachine, a tank containing a cooling fluid, in communication with the discharge passage, a pressurizing device comprising an auxiliary pyrotechnic charge in communication with the tank for pressurizing the tank solely with gas generated by firing the auxiliary pyrotechnic charge, and an injector device configured to inject the cooling fluid into said gas discharge passage; wherein the firing device for the main pyrotechnic charge and the auxiliary pyrotechnic charge are communicably coupled to a control unit, wherein the control unit is configured to fire the auxiliary pyrotechnic charge before the main pyrotechnic charge, and wherein the auxiliary pyrotechnic charge is dimensioned so as to spread out the injection of the cooling fluid over a duration that is longer than that for which the gas generated by firing the main pyrotechnic charge is discharged.

2. The pyrotechnic device according to claim 1, wherein said cooling fluid is aqueous.

3. The pyrotechnic device according to claim 2, wherein said cooling fluid also contains an antifreeze.

4. The pyrotechnic device according to claim 3, wherein said antifreeze is methanol, ethylene glycol, propylene glycol, or glycerol.

5. The pyrotechnic device according to claim 2, wherein the injector device comprises an ejector installed in said discharge passage.

6. The pyrotechnic device according to claim 1, wherein the pressurizing device comprises a piston in said tank.

7. The pyrotechnic device according to claim 6, wherein the injector device further includes a plug interposed between said tank and the discharge passage.

8. The pyrotechnic device according to claim 6, wherein the injector device comprises an ejector installed in said discharge passage.

9. The pyrotechnic device according to claim 6, wherein the injector device comprises an ejector installed in said discharge passage.

10. The pyrotechnic device according to claim 6, further comprising a plug installed in said discharge passage.

11. The pyrotechnic device according to claim 1, wherein the injector device further includes a plug interposed between said tank and the discharge passage.

12. The pyrotechnic device according to claim 11, wherein the injector device comprises an ejector installed in said discharge passage.

13. The pyrotechnic device according to claim 11, further comprising a plug installed in said discharge passage.

14. The pyrotechnic device according to claim 1, wherein the injector device comprises an ejector installed in said discharge passage.

15. The pyrotechnic device according to claim 1, further comprising a plug installed in said discharge passage.

16. A turbomachine including the turbine and the pyrotechnic device according to claim 1, wherein the discharge passage is connected to an inlet passage of the turbine.

17. The pyrotechnic device according to claim 1, wherein said pyrotechnic charge and auxiliary pyrotechnic charge are both solid pyrotechnic charges.

18. The pyrotechnic device according to claim 1, wherein the pressurizing device comprises a diaphragm in said tank.

19. A method of cooling gas generated by firing a main pyrotechnic charge of a pyrotechnic device, wherein a cooling fluid is pressurized solely by gas generated by firing an auxiliary pyrotechnic charge, and injected by an injector device into a discharge passage in which the gas generated by firing the main pyrotechnic charge flows, wherein the gas is discharged from the discharge passage to a turbine of a turbomachine, wherein a firing device for the main pyrotechnic charge, and the auxiliary pyrotechnic charge, are communicably coupled to a control unit, wherein the control unit fires the auxiliary pyrotechnic charge before the main pyrotechnic charge, and wherein the injection of the cooling fluid is spread out over a duration that is longer than that for which the gas generated by firing the main pyrotechnic charge is discharged.

20. The pyrotechnic device according to claim 19, wherein said pyrotechnic charge and auxiliary pyrotechnic charge are both solid pyrotechnic charges.

* * * * *